Dec. 24, 1968   R. C. SCHWINDY   3,417,970
METHOD AND APPARATUS FOR INTERFUSING THERMOPLASTIC MATERIAL
Filed Nov. 13, 1967

United States Patent Office 3,417,970
Patented Dec. 24, 1968

3,417,970
METHOD AND APPARATUS FOR INTERFUSING THERMOPLASTIC MATERIAL
Robert Charles Schwindy, Terre Haute, Ind., assignor to Ethyl Corporation, New York, N.Y., a corporation of Virginia
Filed Nov. 13, 1967, Ser. No. 682,328
10 Claims. (Cl. 259—7)

ABSTRACT OF THE DISCLOSURE

An apparatus for interfusing molten thermoplastic material flowing through a cylindrical passage. The interfusing device includes a generally cylindrically shaped body positioned within the passage conveying fluid thermoplastic material. The body provides a plurality of passages extending therethrough and carries a conical projection on its forward end to divert the plastic stream into the passages. A series of longitudinally aligned parallel passages are provided in an evenly spaced pattern around the face of the diffuser together with a series of passages having a ninety degree turn so that they terminate in openings provided in the sidewall of the cylindrically shaped body. By mixing and breaking the plastic flow into a number of small streams moving in different directions and by providing a close fit between the cylindrical wall of the diffuser body and the interior wall of the conduit a thorough mixing of the thermoplastic material is achieved which alleviates streaks caused by poor homogenization or melt channeling of the thermoplastic material.

Background of the invention

*Field of the invention.*—This invention relates to an apparatus for the mixing of fluid thermoplastic material to remove melt streaks from the plastic material.

*Description of the prior art.*—Previously melt streaks have been alleviated by the use of flow constrictors, float screws, perforated discs, spiral fixed and floating screws which rotate the entire melt but do not move increments of the melt with respect to each other in a positive manner. The most common prior art device is the rotating screw mounted ahead of the die. The screw may be either a fixed or a floating rotating screw used to move the fluid plastic around to provide mixing and to also eliminate any temperature gradient present in the flowing plastic stream. However, these devices do not always effect a sufficient intermixing of the plastic flow to eliminate the streaks that are produced in thin gauge plastic film by extrusion from an annular die. Melt streaks appearing in thermoplastic film, particularly in polyethylene film, lower the quality of the film and cause the film to be rejected for certain uses.

Summary of the invention

It is an object of this invention to provide a melt diffuser for thermoplastic material which will completely interfuse fluid thermoplastic material without causing any severe restrictions or impediment to the flow of the thermoplastic material.

It is also an object of the present invention to provide an apparatus for interfusing fluid thermoplastic material which is of relatively simple construction and may be easily inserted or removed from the fluid thermoplastic flow path.

The foregoing objects may be carried out in an apparatus for mixing fluid thermoplastic material by providing a generally cylindrical body with means for either rotatably or fixedly mounting the body within a generally cylindrical passage through which the plastic flows. The generally cylindrical body provides a plurality of parallel, longitudinally extending passages therethrough. The body also provides a plurality of passages extending from openings provided in one end of the body to openings provided in the cylindrical sidewall of the body. Optional means to rotate the cylindrical body may be provided in particular in the form of turbine blades attached to a shaft affixed to the cylindrical body.

The process of the present invention may be carried out by displacing one portion of a stream of flowing fluid thermoplastic material arcuately while maintaining the flow of the portion in an axial direction. Another portion of the flowing stream is displaced both radially and arcuately.

Description of the preferred embodiments

Figure 1:
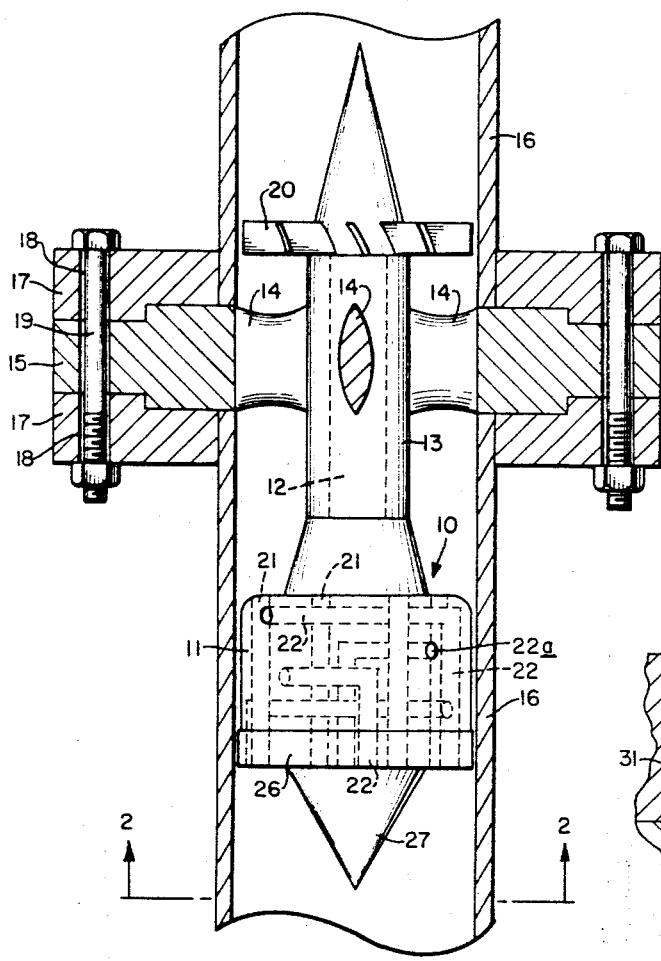
FIGURE 1 is a sectional view through a conduit for fluid thermoplastic material having one embodiment of the melt diffuser of the present invention mounted therein.
Figure 3:
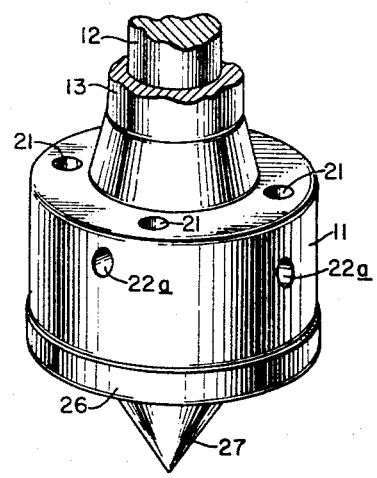
FIGURE 3 is a perspective view of the cylindrical body portion of the diffuser apparatus shown in FIGURE 1.

Referring now to FIGURE 1 it will be seen that this embodiment of the melt diffuser, designated generally by the numeral 10, includes a generally cylindrically shaped mixer or body section 11 which is affixed to a rotatable shaft 12. The shaft 12 is carried by a generally cylindrically shaped sleeve 13 which is supported by a set of four evenly spaced spiders 14 (only three of which can be seen). The spiders terminate at their outward ends in an annular shaped mounting flange 15. Each end of the thermoplastic conduit 16 is provided with an integral flange 17 which mates with and holds the mounting flange 15 for the melt diffuser. A plurality of longitudinally aligned openings 18 are provided in the flanges to receive bolts 19 to couple the respective flanges to the melt diffuser flange.

In the melt diffuser shown in FIGURE 1 the rearward end of shaft 12 is provided with a turbine blade impeller 20 which rotates the shaft 12 and thereby causes rotation of the cylindrical body or mixer section 11 as the plastic flow passes over the turbine blade. The body section 11 has a number of straight, parallel, longitudinally aligned passages 21 therethrough. The body also provides a plurality of passages 22 therein which have their inlet opening in the face of the body section but which make a ninety degree turn and terminate in outlet openings 22a on the sidewall of the cylindrical body 11. A conical projection 27 extends forward from the front face of the body 11 to divert the flowing plastic into the inlet openings of passages 21 and 22. The body 11 is provided with a raised annular shoulder 26 which makes a close sliding fit with the inner wall of the conduit 16 to permit the body 11 to be rotated but to prevent the flow of any substantial amount of thermoplastic material between the shoulder and the conduit. As seen in FIGURE 1 the clearance between that portion of the sidewall of the body behind the annular shoulder and the inside wall of the conduit is also kept very close, preferably on the order of about 0.020 inch gap in order to provide high shear for the plastic flowing out the openings 22a in the sidewall of the body. This spacing will need to be determined for each thermoplastic material in order to achieve maximum intermixing.

In the embodiment of the melt diffuser shown in FIG-

URE 4 the forward end of the body 11 is provided with a flange 23 which is received between pipe flanges 24—24 and retained therein by bolts 25. In this embodiment the body 11 does not rotate but depends upon the diversion of the plastic tangently to the normal flow and the shearing produced by the flow of plastic through the diverging openings 22a to provide a high mix ratio for the thermoplastic passing through the body 11.

Figure 5:
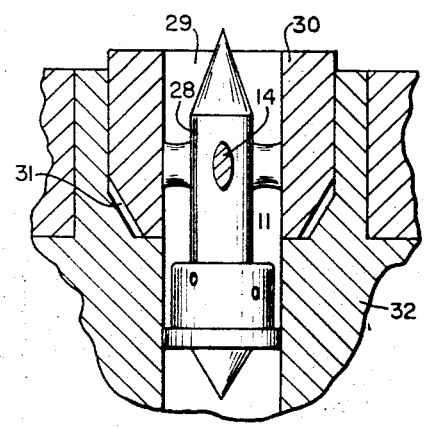
FIGURE 5 is a view similar to FIGURE 1 of still another embodiment of the melt diffuser.
Figure 2:
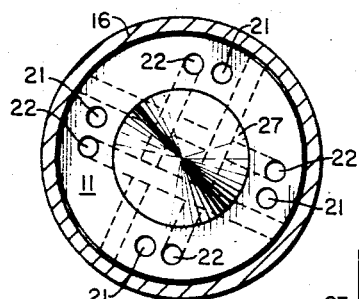
FIGURE 2 is a cross sectional view of FIGURE 1 taken along line 2—2.
Figure 4:
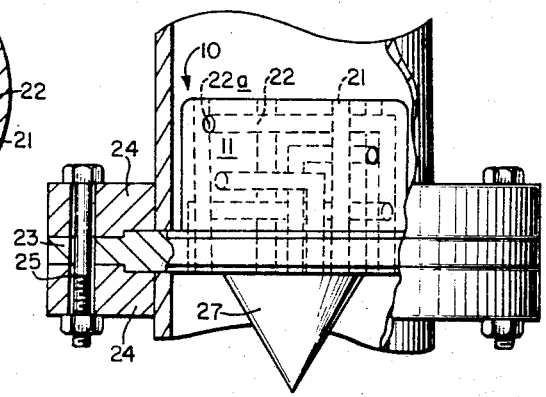
FIGURE 4 is a view similar to FIGURE 1 of another embodiment of the melt diffuser.

In the embodiment of the melt diffuser apparatus seen in FIGURE 5 the body 11 is fixedly attached to rearwardly extending shaft 28 and does not rotate. Shaft 28 is supported centrally within the opening 29 in insert ring 30 by means of a plurality of spiders 14. Insert ring 30 is received in an annular recess 31 provided at the top of rotating coupling 32 (only a portion of which is shown). Rotating couplings are commonly used to couple an annular die to a plastic extrusion machine to permit the die to be rotated or oscillated to produce thin wall, lay-flat tubing for conversion to plastic sheet film by the blown bubble process. Exemplary rotating couplings in which the melt diffuser of the present invention may be mounted are disclosed in copending U.S. patent application Ser. No. 618,713, filed Feb. 27, 1967, and Ser. No. 619,414, filed Feb. 28, 1967, both of which are assigned to the assignee of the present application.

It is understood that a large number of passages, both the parallel, longitudinally extending type 21 and the ninety degree diverting type 22 will have to be provided to supply sufficient plastic flow through the passage receiving the melt diffuser. While the embodiments of the apparatus shown in the drawings utilize only eight flow-through passages or channels it is understood that any number of passages may be used to provide sufficient capacity for the particular device, e.g., an annular die for film extrusion, to be fed by the flowing thermoplastic stream. The dimensions of the openings 21 and 22 provided in the melt diffuser will also be determined by the requirements of plastic flow for the particular thermoplastic material being interfused. Extremely viscous high flow plastic material will require larger openings in order to permit sufficient flow. The more fluid thermoplastic materials can be satisfactorily interfused by smaller diameter openings.

The device of the present invention may be constructed from a mild steel for use in extruding polyolefins, e.g., high or low pressure polyethylene, polypropylene, ethylene-vinyl acetate copolymers, etc. For corrosive material such as polyvinyl chloride it is preferred that the melt diffuser be constructed of stainless steel or other corrosion resistant material.

While there has been described what is at present considered to be the preferred embodiments of the present invention it will be apparent to those skilled in the art that various modifications and changes may be made without departing from the essence of the invention. It is intended to cover herein all such modifications and changes as come within the true scope of the following claims.

What is claimed is:
1. Apparatus for mixing fluid thermoplastic material comprising:
   (a) first means for causing one portion of a large stream of flowing fluid thermoplastic material to be divided into a first plurality of smaller parallel flowing fluid streams moving in the same path as said large stream;
   (b) second means for causing another portion of said large stream to be divided into a second plurality of smaller streams each having a portion of its flow path extending transversely to the direction of flow of said large stream and said first plurality of smaller streams; and
   (c) third means for recombining the respective pluralities of smaller streams into a continuing large stream moving in the same direction of flow as the original large stream.
2. The apparatus of claim 1 wherein said first and second means for dividing said fluid thermoplastic material are fixedly mounted in a passage through which said thermoplastic material flows.
3. The apparatus of claim 1 wherein said first and second means for dividing said fluid thermoplastic material are rotatably mounted in a passage through which said thermoplastic material flows.
4. Apparatus as defined in claim 1 wherein said first means comprises a plurality of parallel, straight, longitudinally extending passages provided in a cylindrical body and said second means comprises a plurality of passages extending from openings provided in one end of said body to openings provided in the cylindrical wall of said body.
5. The apparatus of claim 4 wherein the inlet ends of said passages are uniformly arranged on one end of said body and said body is provided with an axially aligned conical projection on said one end of said body.
6. Apparatus for mixing fluid thermoplastic material comprising:
   (a) first means for arcuately displacing one portion of a stream of flowing fluid thermoplastic material while maintaining the flow of said portion in an axial direction;
   (b) second means for radially and arcuately displacing another portion of said stream of flowing fluid thermoplastic material; and
   (c) third means for recombining said portions subsequent to their displacement.
7. Apparatus as defined in claim 6 wherein said first means comprises a plurality of parallel, longitudinally extending passages provided in a rotatably mounted cylindrical body and said second means comprises a plurality of passages extending from openings provided in one end of said body to openings provided in the cylindrical wall of said body.
8. Apparatus for mixing fluid thermoplastic material comprising:
   (a) a longitudinally extending shaft;
   (b) means rotatably mounting said shaft within a generally cylindrical conduit;
   (c) a generally cylindrical body mounted on said shaft,
      (i) said body providing a plurality of parallel, longitudinally extending passages therethrough,
      (ii) said body also providing a plurality of passages extending from openings provided in one end of said body to openings provided in the cylindrical sidewall of said body; and
   (d) means to rotate said shaft and said body in said conduit.
9. A process for mixing fluid thermoplastic material comprising:
   (a) displacing one portion of a stream of flowing fluid thermoplastic material arcuately while maintaining the flow of said portion in an axial direction;
   (b) displacing another portion of said stream of flowing fluid thermoplastic material radially and arcuately; and
   (c) recombining said portions after displacement.
10. The process of claim 9 wherein the said another portion of said flowing stream is also subjected to a shearing action before it is recombined with the remainder of said stream of flowing thermoplastic material.

References Cited
UNITED STATES PATENTS

| | | | |
|---|---|---|---|
| 2,965,362 | 12/1960 | Flottmann et al. | 259—8 |
| 3,041,051 | 6/1962 | Reiffen | 259—8 XR |
| 3,128,794 | 4/1964 | Boucher et al. | 259—4 XR |

WALTER A. SCHEEL, *Primary Examiner.*

JOHN M. BELL, *Assistant Examiner.*

U.S. Cl. X.R.

138—37; 259—4